United States Patent
Kawamura et al.

(10) Patent No.: US 8,449,197 B2
(45) Date of Patent: May 28, 2013

(54) BEARING APPARATUS FOR A WHEEL OF VEHICLE

(75) Inventors: Hiroshi Kawamura, Iwata (JP); Kazuhisa Shigeoka, Iwata (JP); Akira Fujimura, Iwata (JP); Koji Nishino, Iwata (JP); Hisashi Ohtuski, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/005,111

(22) Filed: Jan. 12, 2011

(65) Prior Publication Data

US 2011/0188792 A1     Aug. 4, 2011

Related U.S. Application Data

(62) Division of application No. 10/580,961, filed as application No. PCT/JP2004/015144 on Oct. 14, 2004, now abandoned.

(30) Foreign Application Priority Data

Dec. 1, 2003   (JP) ................................. 2003-401112
Mar. 19, 2004  (JP) ................................. 2004-079683
Sep. 16, 2004  (JP) ................................. 2004-269093

(51) Int. Cl.
*F16C 19/38*   (2006.01)
*F16C 35/063*  (2006.01)
*F16C 33/76*   (2006.01)

(52) U.S. Cl.
USPC ........ 384/489; 384/544; 384/548; 301/105.1; 301/108.1

(58) Field of Classification Search
USPC ............ 384/489, 544, 548; 301/105.1, 108.1, 301/108.3; 138/89
See application file for complete search history.

(56) References Cited

U.S. PATENT DOCUMENTS 4,424,047 A   1/1984   Welschof et al.
4,629,028 A   12/1986  Krude et al.
(Continued)

FOREIGN PATENT DOCUMENTS

AT    32998 T      4/1988
AU    1027783 A    7/1983
(Continued)

*Primary Examiner* — William C Joyce
(74) *Attorney, Agent, or Firm* — Harness, Dickey & Pierce, P.L.C.

(57) ABSTRACT

A vehicle wheel bearing apparatus which reduces the weight, size and number of parts and also prevents ingress of rain water or dusts and leakage of differential gear oil has an axle housing supported under a body of a vehicle. A hollow drive shaft is inserted into the axle housing. A wheel bearing is arranged between the drive shaft and an opening of the axle housing and is structured as a unit including a wheel hub and a double row rolling bearing. The wheel bearing includes an inner member with a wheel hub integrally formed with a wheel mounting flange on one end and an axially extending cylindrical portion. At least one inner ring is press-fit onto the cylindrical portion of the wheel hub. The inner ring is formed with at least one of the inner raceway surfaces on its outer circumferential surface. An outer member is arranged around the inner member and formed with double row outer raceway surfaces on its inner circumferential surface opposite to the inner raceway surfaces. Double row rolling elements are arranged between the inner and outer raceway surfaces of the inner member and the outer member. A cage freely rollably holds the rolling elements. Seals seal an annular space between the inner member and the outer member. A cap, having a metal core formed from steel, is press-fit into an end of a central bore of the wheel hub.

7 Claims, 7 Drawing Sheets

U.S. PATENT DOCUMENTS

| | | | |
|---|---|---|---|
| 5,320,580 A | 6/1994 | Simon | |
| 5,603,554 A | 2/1997 | Monroe et al. | |
| 5,814,984 A * | 9/1998 | Ohmi et al. | 324/173 |
| 6,135,571 A | 10/2000 | Mizukoshi et al. | |
| 6,280,096 B1 | 8/2001 | Miyazaki et al. | |
| 6,422,758 B1 | 7/2002 | Miyazaki et al. | |
| 6,974,259 B2 | 12/2005 | Nomura et al. | |
| 7,255,482 B2 | 8/2007 | Yamamoto | |
| 2001/0046339 A1 | 11/2001 | Miyazaki et al. | |
| 2002/0068639 A1 | 6/2002 | Tajima et al. | |
| 2002/0146185 A1 | 10/2002 | Miyazaki et al. | |
| 2003/0103705 A1 | 6/2003 | Miyazaki et al. | |
| 2007/0286536 A1 | 12/2007 | Kawamura et al. | |

FOREIGN PATENT DOCUMENTS

| | | |
|---|---|---|
| BR | 8204068 A | 7/1983 |
| DE | 31 32 364 C1 | 2/1983 |
| EP | 0 084 488 A1 | 7/1983 |
| EP | 0 854 303 A2 | 7/1998 |
| EP | 1 190 870 A2 | 3/2002 |
| EP | 1 312 821 A2 | 5/2003 |
| EP | 1 314 903 A3 | 5/2003 |
| EP | 1 319 854 A2 | 6/2003 |
| ES | 277342 U | 10/1984 |
| FR | 2 511 454 A | 2/1983 |
| FR | 2 519 587 A1 | 7/1983 |
| GB | 2 104 191 A | 3/1983 |
| IT | 1157561 B | 2/1987 |
| JP | 58-30804 A | 2/1983 |
| JP | 58-170601 A | 10/1983 |
| JP | 1-178223 | 12/1989 |
| JP | 07-217753 A | 8/1995 |
| JP | 11-129703 A | 5/1999 |
| JP | 11-301206 | 11/1999 |
| JP | 2001-099172 | 4/2001 |
| JP | 2001-138704 A | 5/2001 |
| JP | 2001-150906 | 6/2001 |
| JP | 2001-225606 | 8/2001 |
| JP | 2001-294005 | 10/2001 |
| JP | 2002-029209 | 1/2002 |
| JP | 2002-061661 | 2/2002 |
| JP | 2002-087008 | 3/2002 |
| JP | 2002-172910 | 6/2002 |
| JP | 2002-187406 A | 7/2002 |
| JP | 2002-219903 A | 8/2002 |
| JP | 2002-235765 A | 8/2002 |
| JP | 2003-237305 | 8/2003 |
| JP | 2003-246203 | 9/2003 |

* cited by examiner (a)          (b)

ately secured by both its ends being sandwiched by the flange 56 of the drive shaft 52 and a brake rotor 61. Double row conical rollers 62 are rollably contained by cages 63 between the annular space between the inner and outer rings 57 and 60. Seals 64 are arranged at both ends of the annular space to seal off the inside of the wheel bearing from the outside.

BEARING APPARATUS FOR A WHEEL OF VEHICLE

CROSS-REFERENCE TO RELATED APPLICATIONS

This application is a divisional of U.S. Ser. No. 10/580,961, filed Aug. 30, 2006, which is a National Stage of International Application No. PCT/JP2004/015144, filed Oct. 14, 2004, which claims priority to Japanese Patent Application No. 2003-401112, filed Dec. 1, 2003, Japanese Patent Application No. 2004-0079683, filed Mar. 19, 2004 and Japanese Patent Application No. 2004-269093, filed Sep. 16, 2004. The disclosures of the above applications are incorporated herein by reference.

FIELD

The present disclosure relates to a vehicle wheel bearing apparatus to rotatably support the wheel relative to a suspension apparatus of the vehicle and, more particularly, to a vehicle wheel bearing apparatus of the semi-floating type where a driving wheel is supported by a double row rolling bearing.

BACKGROUND

In a vehicle such as a truck having a body with a frame structure, an axle structure of a driving wheel of a full-floating type bearing has been widely adopted. In recent driving wheel supporting structure, a unit structure of a double row rolling bearing has been widely adopted. This unit improves the readiness of assembly and reduction of weight and size. One example of such a prior art vehicle wheel bearing apparatus is shown in FIG. 9.

In this vehicle wheel bearing apparatus, a drive shaft 52, connected to a differential apparatus (not shown), is inserted into an axle housing 51. A double row conical roller bearing 53 is mounted on the axle housing 51. A wheel hub 54 is rotatably supported by the double row conical roller bearing 53. The wheel hub 54 is connected to a flange 56 via hub bolts 55. A pair of inner rings 57 is connected to each other by a connecting ring 58. The rings 57 are fit onto the end of the axle housing 51 and then securely fastened by a fastening nut 59. An outer ring 60 of the double row conical roller bearing is fitted into the wheel hub 54. The outer ring 60 is axially secured by both its ends being sandwiched by the flange 56 of the drive shaft 52 and a brake rotor 61. Double row conical rollers 62 are rollably contained by cages 63 between the annular space between the inner and outer rings 57 and 60. Seals 64 are arranged at both ends of the annular space to seal off the inside of the wheel bearing from the outside.

The inboard side end of the inner ring 57 is formed with an annular stepped portion 65. The stepped portion 65 receives and mounts a seal ring 66. An annular recess 67 is formed on the outer circumferential surfaces of the inner rings 57 at mutually abutted portions of the pair of inner rings 57. An elastic seal ring 68 is fit into the recess 67. These seal rings 66 and 68 prevent penetration or ingress of rain water or dusts into the axle housing 51, leakage of differential gear oil to the outside and ingress of the differential gear oil into the inside of the bearing (see Japanese Laid-open Patent publication No. 99172/2001).

However since the prior art vehicle wheel bearing apparatus has a structure where the double row of conical roller bearing 53 is arranged between the wheel hub 54 and the axle housing 51, the driving shaft 52 is inserted into the axle housing 51 and the flange 56 of this drive shaft 52 is connected to the wheel hub 54 by the hub bolts 55, a reduction of the weight and size of the bearing apparatus is limited. Also, the assembly of the bearing apparatus is complicated due to the requirement of a large number of structural parts.

SUMMARY OF THE INVENTION

It is therefore an object of the present disclosure to provide a vehicle wheel bearing apparatus which can reduce the weight, size and the number of parts. Also, a bearing apparatus can prevent the ingress of rain water or dusts and the leakage of differential gear oil.

According to the present disclosure, a vehicle wheel bearing apparatus comprises an axle housing supported under a body of a vehicle. A hollow drive shaft is inserted into the axle housing. A wheel bearing is arranged between the drive shaft and an opening of the axle housing and is structured as a unit of a wheel hub and a double row rolling bearing. The wheel bearing comprises an inner member which includes a wheel hub with an integrally formed wheel mounting flange on one end and an axially extending cylindrical portion. At least one inner ring is press-fit onto the cylindrical portion of the wheel hub. The outer circumferential surface of the inner ring is formed with at least one of the inner raceway surfaces. An outer member is arranged around the inner member. The outer member is formed with double row outer raceway surfaces on its inner circumferential surface. The outer raceway surfaces are opposite to the inner raceway surfaces. Double row rolling elements are arranged between the inner and outer raceway surfaces of the inner member and the outer member. A cage freely rollably holds the rolling elements. Seals are provided to seal an annular space between the inner member and the outer member. A cap, with a metal core formed from steel, is press-fit into an end of a central bore of the wheel hub.

Since the cap, with the steel metal core, is press-fit into an end of the central bore of the wheel hub forming the wheel bearing apparatus, it is possible to provide a vehicle wheel bearing apparatus of a semi-floating type which can reduce weight and size. Also, the bearing apparatus can prevent the leakage of differential gear oil to the outside as well as prevent the ingress of rain water or dusts from the outside into the differential gear oil through the drive shaft.

Since at least one of the inner raceway surfaces is formed directly on the outer circumferential surface of the wheel hub, it is possible to further reduce the bearing weight and size and increase the rigidity of the bearing.

Since, the end of the cylindrical portion is radially outwardly plastically deformed to form a caulked portion to prevent the inner ring from slipping off the cylindrical portion of the wheel hub, it is unnecessary to control the amount of preload of the bearing as in the prior art, by tightly fastening a nut on the inner ring. Thus, the ease of assembly of the bearing apparatus onto a vehicle can be improved. Also, the predetermined amount of preload can be kept for a long term. In addition, it is possible to substantially reduce the number of parts and to reduce manufacturing cost, weight and size of the bearing due to the improvements in the ease of assembly.

Since the outer circumferential region of the wheel mounting flange, from its base to the inboard side to the cylindrical portion, is hardened by high frequency induction hardening to have a surface hardness of 54~64 HRC, and the caulked portion remains unhardened to have a surface hardness of 25 HRC or less after forging, it is possible to improve the durability of the wheel hub and workability of the caulked portion during its plastic deformation. Thus, reliability of the quality of the bearing is improved.

Since the cap is press-fit into the central bore of the wheel hub wheel mounting flange, the cap can be positioned at a region with high rigidity of the wheel hub. Accordingly, the cap is scarcely influenced by elastic deformation of the wheel hub and thus, it is possible to prevent the generation of a radial gap between the cap and the wheel hub.

Since the cap includes a metal core made of steel with a substantially "C" shaped configuration cross-section and an elastic member is attached to at least part of its fitting portion, the elastic member can intimately contact the fitting surface and thus can securely seal the inside of the wheel hub.

Since the cap is press-fit so that the circumferential edge of its fitting portion is oriented toward the outboard side, the press-fitting operation can be easily carried out. In addition, since the edge side of low rigidity is positioned at the outboard side, the cap does not move toward the outboard side. Thus, slipping off of the cap from the wheel hub can be prevented even though the metal core is moved axially due to its deformation caused by elastic deformation of the wheel hub.

Since the circumferential edge of the fitting portion of the metal core is formed with an extending radially outward bead, and an annular groove which engages the bead is formed on the central bore of the wheel hub, it is possible to securely prevent axial movement of the cap. This further improves the reliability of the cap.

Since the cap is limited against axial movement by steps provided at either side of the cap, it is possible to securely prevent the cap from slipping off from the wheel hub even though the wheel hub is elastically deformed by a repeating load applied to it during running of a vehicle.

Since the cap includes a metal core made of steel with a substantially "C" shaped configuration cross section, an annular recess is formed on the inner circumferential surface of the wheel hub, and the fitting portion of the cap is formed with a projection adapted to engage the annular recess, it is possible to easily mount the cap on the wheel hub and to prevent axial movement of the cap with a simple structure.

Since the projection is formed by plastic deformation after the cap has been press-fit into the bore of the wheel hub, the cap can be further intimately fitted into the annular groove of the wheel hub without any rattle. Thus, axial movement of the cap and also leakage of differential gear oil can be further prevented by the mating of the projection and bore.

Since the cap is press-fit with an interference of 0.05~0.3 mm, it is possible to prevent the generation of a radial gap between the cap and the wheel hub due to errors in configuration of the cap. Thus, this prevents leakage of differential gear oil therethrough. In addition, the cap can be easily press-fit into the wheel hub and buckling of the cap, which would be caused by large interference, can also be prevented.

The vehicle wheel bearing apparatus of the present disclosure, which comprises an axle housing supported under a body of vehicle; a hollow drive shaft inserted into the axle housing; a wheel bearing arranged between the drive shaft and an opening of the axle housing which is structured as a unit of a wheel hub and a double row rolling bearing; the wheel bearing comprises an inner member with a wheel hub integrally formed with a wheel mounting flange on one end and having an axially extending cylindrical portion; at least one inner ring is press-fit onto the cylindrical portion of the wheel hub and is formed on its outer circumferential surface with at least one of the inner raceway surfaces; an outer member is arranged around the inner member and is formed with double row outer raceway surfaces on its inner circumferential surface opposite to the inner raceway surfaces; double row rolling elements are arranged between the inner and outer raceway surfaces of the inner member and the outer member; a cage freely rollably holds the rolling elements; and seals seal an annular space between the inner member and the outer member; a cap, with a metal core of steel, is press-fit into an end of a central bore of the wheel hub, makes it possible to provide a vehicle wheel bearing apparatus of a semi-floating type which can reduce the weight and size of the bearing apparatus. Also, it prevents leakage of differential gear oil to the outside as well as the ingress of rain water or dusts from the outside into the differential gear oil through the drive shaft.

According to the disclosure, a vehicle wheel bearing apparatus comprises an axle housing supported under a body of the vehicle. A hollow drive shaft is inserted into the axle housing. A wheel bearing is arranged between the drive shaft and an opening of the axle housing. The wheel bearing is structured as a unit with a wheel hub and a double row rolling bearing. The wheel bearing has an inner member which includes a wheel hub integrally formed with a wheel mounting flange on one end and an axially extending cylindrical portion. At least one inner ring is press-fit onto the cylindrical portion of the wheel hub. The inner ring outer circumferential surface is formed with at least one inner raceway surfaces. An outer member is arranged around the inner member. The outer member is formed with double row outer raceway surfaces on its inner circumferential surface opposite to the inner raceway surfaces. Double row rolling elements are arranged between the inner and outer raceway surfaces of the inner member and the outer member. A cage freely rollably holds the rolling elements. Seals seal an annular space between the inner member and the outer member. A cap, with a metal core of steel, is press-fit into an end of a central bore of the wheel hub.

BRIEF DESCRIPTION OF THE DRAWINGS

Additional advantages and features of the present disclosure will become apparent from the subsequent description and the appended claims, taken in conjunction with the accompanying drawings, wherein:

DESCRIPTION OF THE PREFERRED EMBODIMENTS

Preferred embodiments of the present disclosure will be described with reference to the accompanying drawings.

Figure 1:
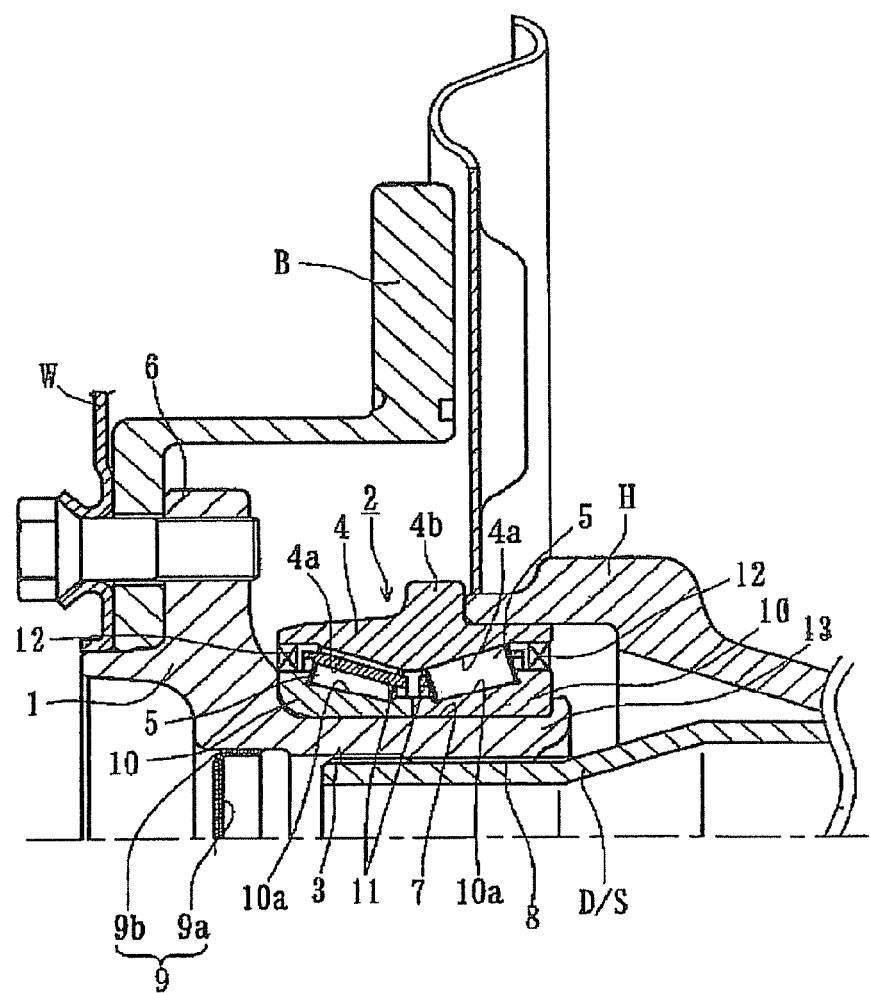
FIG. 1 is a longitudinal-section view of a first embodiment of a vehicle wheel bearing apparatus.
Figure 2:
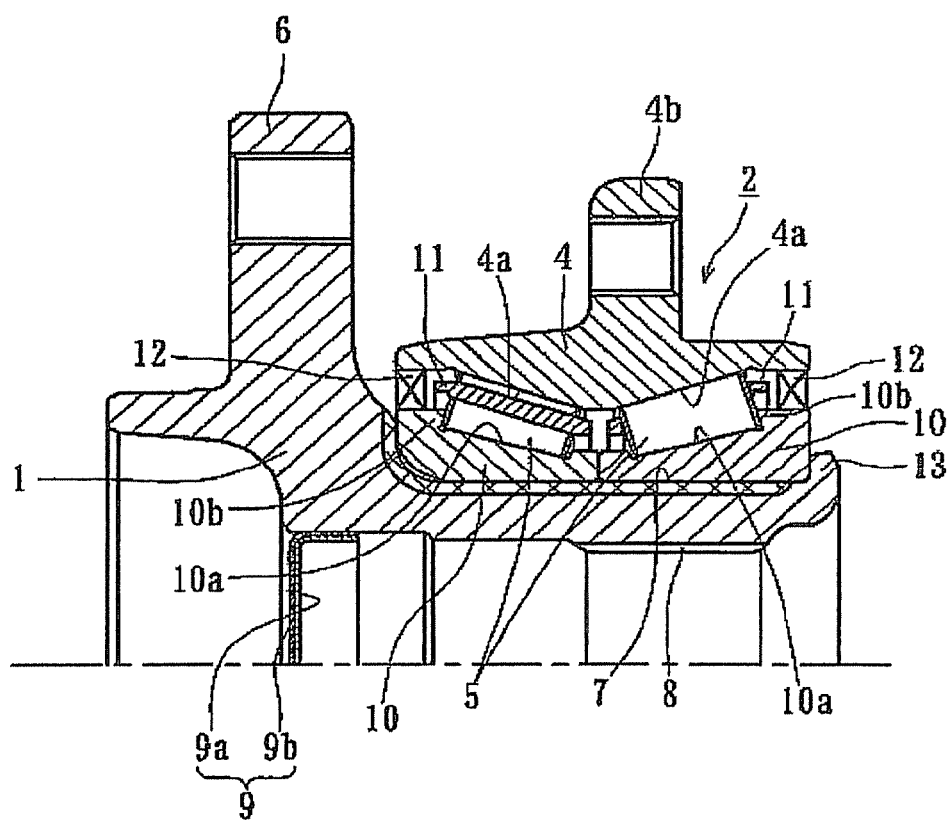
FIG. 2 is a partially enlarged longitudinal-section view of FIG. 1.

FIG. 1 is a longitudinal-section view of a first embodiment of a vehicle wheel bearing apparatus. FIG. 2 is a partially enlarged longitudinal-section view of FIG. 1. In the present description, a side of the bearing positioned outward of a vehicle, when it is mounted on the vehicle, is referred to as the "outboard" side (the left side in a drawing). A side inward of the vehicle is referred to as the "inboard" side (the right side in a drawing).

In the vehicle wheel bearing apparatus, a wheel hub 1 and a double row rolling bearing 2 are formed as a unit and are connected to a drive shaft "D/S". The double row rolling bearing 2 includes an inner member 3, an outer member 4, and double row rolling elements (tapered rollers) 5 freely rollably contained between the inner and outer members 3 and 4. The inner member 3 includes the wheel hub 1 and a pair of inner rings 10 press-fit onto the wheel hub 1. The wheel hub 1 is integrally formed, at its outboard side, with a wheel mounting flange 6 on which, a wheel "W" and a brake rotor "B" are mounted. An axially extending cylindrical portion 7 extends from the flange 6. An inner circumferential surface (bore) of the wheel hub 1 is formed with a serration (or spline) 8 to receive a serrated portion of the drive shaft "D/S" to transmit torque between the two.

As shown in FIG. 2, the double row rolling bearing 2 includes an outer member 4 formed with double row outer raceway surfaces 4a on its inner circumferential surface. A body mounting flange 4b is formed on the outer member 4. The flange 4b is to be secured on an axle housing "H" on its outer circumferential surface. A pair of inner rings 10 are inserted into the outer member 4. The inner rings 10 are formed with double row tapered inner raceway surfaces 10a, 10a on their outer circumferential surface opposite to the outer raceway surfaces 4a. Double row rolling elements 5 are arranged between the inner and outer raceway surfaces 10a, 4a. A cage 11 freely rollably holds the rolling elements 5. Each of the inner rings 10 is formed with, at its larger diameter end, a large flange 10b to guide the rolling elements 5. The pair of inner rings 10 is arranged so that their inner ends abut each other. Thus, they form a so-called back-abutted type double row tapered roller bearing. Seals 12 are arranged at both ends, of the outer member 4 to seal an annular space between the outer member 4 and the inner rings 10. The seals 12 prevent both penetration of rain water or dusts from external circumstances and leakage of lubricating grease sealed within the bearing. The inboard side seal 12 further prevents penetration or ingress of differential gear oil into the inside of the bearing.

The pair of inner rings 10 are press-fit onto the cylindrical portion 7 of the wheel hub 1. The inner rings 10 are prevented from axially slipping off of the cylindrical portion 7 by a caulked portion 13. The caulked portion is formed by plastically deforming the end of the cylindrical portion 7 radially outward. Since this embodiment adopts the self-retaining structure of the second generation, it is not required to control an amount of preload as in a conventional manner by tightly fastening a nut against the inner ring. Accordingly, it is possible to substantially reduce the number of parts and thus to improve the readiness of assembly as well as to reduce its manufacturing cost, size and weight.

The wheel hub 1 is made of medium carbon steel such as S53C which includes carbon of 0.40~0.80% by weight. The wheel hub 1 is hardened by high frequency induction quenching so that the base of the wheel mounting flange 6, at its inboard side, and the cylindrical portion 7 of the wheel hub 1 have a surface hardness of 54~64 HRC (the hardened portion is shown in drawings by cross-hatched lines). The caulked portion 13 remains as an unhardened portion and has its surface hardness of 25 HRC or less. This improves the durability and workability of the caulked portion 13 and also prevents the generation of cracks.

The outer member 4 is also made of medium carbon steel such as S53C which includes carbon of 0.40~0.80% by weight. The double row outer raceway surfaces 4a and inner circumferential surface of the outer member 4, on which the seal 12 is mounted, are hardened by high frequency induction quenching so that their surface hardness is within 54~64 HRC. The inner rings 10 are made of high carbon chrome bearing steel such as SUJ2. The inner rings 10 are hardened to the core by dip quenching to have a surface hardness of HRC 54~64. Even though the double row tapered roller bearing is illustrated using tapered roller as the rolling elements 5, a double row angular ball bearing using balls may also be used.

In this embodiment, a cap 9 is press-fit into an opening of the wheel hub 1 at its outboard side. This cap 9 is made of austenitic-stainless steel sheet (JIS SUS 304 etc.) or preserved cold rolled steel sheet (JIS SPCC etc.) and is formed as an annular shape by press working. The cap 9 includes a metal core 9a formed from steel. The cap 9 has a substantially "C"-shaped cross-section. An elastic member 9b, of rubber, is bonded, via vulcanization, to at least the fitting portion of the metal core 9a. The elastic member 9b is elastically deformed during the press fitting of the cap 9 into the opening of the wheel hub 1 to seal the opening. The seal surely prevents ingress of rain water or dusts from the ambient circumstances into the drive shaft "D/S" and thus into the differential gear oil.

It is preferable that the cap 9 is press-fit into the wheel hub 1 with a interference of 0.05~0.3 mm. This is because the differential gear oil could leak through a small radial gap which would be caused in the fitting portion between the wheel hub 1 and the cap 9 due to dimensional errors of the cap itself when the interference is less than 0.05 mm. On the other hand, the press-fitting operation of the cap 9 becomes difficult and buckling of the metal core may occur when the interference is larger than 0.3 mm. In addition, it is preferable that the cap 9 is press-fit into the wheel hub 1 at a high rigid bore portion. That is, a bore portion of the wheel hub 1 at or near the wheel mounting flange 6. Accordingly, the cap 9 is scarcely influenced by elastic deformation of the wheel hub 1 even though the wheel hub 1 would be deformed by applying repeated moment loads.

Figure 3:
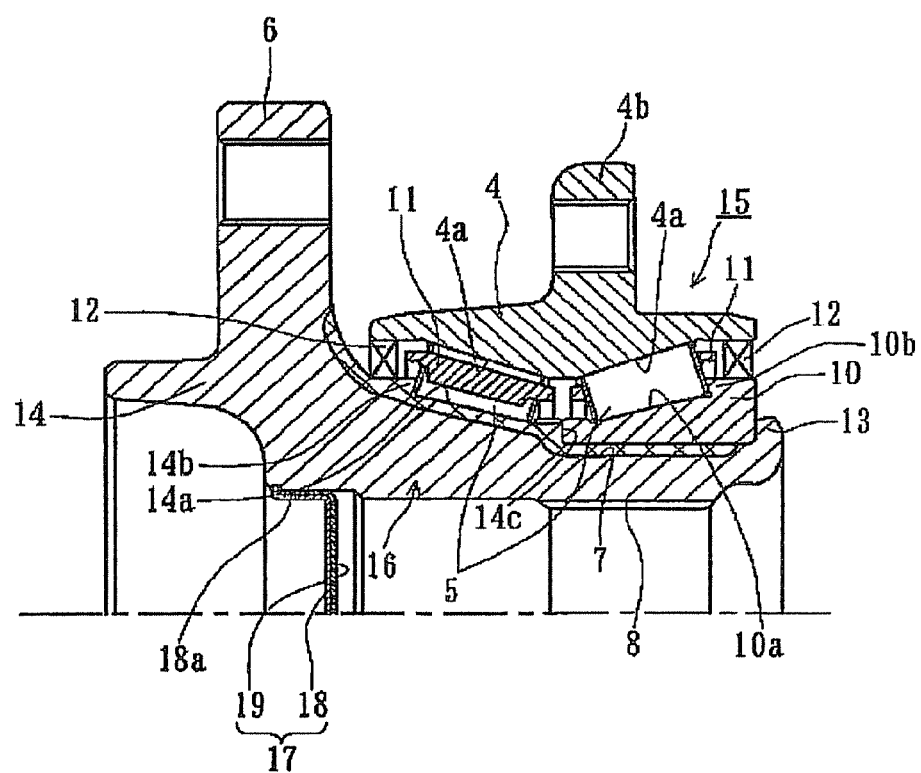
FIG. 3 is a longitudinal-section view of a second embodiment of a vehicle wheel bearing apparatus.

FIG. 3 is a longitudinal-section view of a second embodiment of the vehicle wheel bearing apparatus. Since the difference between this embodiment and the first embodiment only resides in the structure of the wheel hub, the same numerals are used as those used in the first embodiment to designate the same structural elements.

The vehicle wheel bearing apparatus is structured as a unit with the wheel hub 14 and a double row rolling bearing 15. The double row rolling bearing 15 includes an inner member 16, an outer member 4, and a double row rolling elements 5 and 5 freely rollably contained between the inner and outer members 16 and 4. The inner member 16 includes the wheel hub 14 and the inner ring 10 press-fit onto the wheel hub 14. The wheel hub 14 is integrally formed, at its outboard side, with a wheel mounting flange 6 on which, a wheel (not shown in FIG. 3) is mounted. An inner raceway surface 14a is formed on the wheel hub 14 on the outboard side of the bearing 15. Also, the wheel hub 14 has the cylindrical portion 7 axially extending from the inner raceway surface 14a. The wheel hub 14 is formed with a serration (or spline) 8 on its inner circumferential surface (bore) to receive a serrated portion of the drive shaft (not shown in FIG. 3) to transmit torque between the two.

The outer circumferential surface of the wheel hub 14 is formed with a flange portion 14b, corresponding to the large flange 10b of the inner ring 10, and a stepped portion 14c, which abuts an inner end face (smaller end face). Thus, the so-called back-abutted type double row tapered roller bearing is formed. In addition, the inner ring 10 is press-fit onto the cylindrical portion 7 of the wheel hub 14. The inner ring 10 is prevented from axially slipping off of the cylindrical portion 7 by a caulked portion 13. The caulked portion 13 is formed by plastically deforming the end of the cylindrical portion 7 radially outward. Since this embodiment adopts a self-retaining structure of such a third generation, it is not required to control an amount of preload in a manner similar to the first embodiment by tightly fastening a nut against the inner ring. Accordingly, it is possible to improve the readiness of assembly as well as to maintain the amount of preload for a long term.

Since the inner raceway surface 14a is directly formed on the outer circumferential surface of the wheel hub 14, the rigidity of the wheel hub 14 is increased. Accordingly, it is possible to reduce the size and weight of the bearing apparatus and to improve it even though the wheel hub 14 would be deformed by an moment load applied during running of the vehicle.

A cap 17 is press-fitted into an opening of the wheel hub 14 at its outboard side. The cap 17 is made of austenitic-stainless steel sheet (JIS SUS 304 etc.) or preserved cold rolled steel sheet (JIS SPCC etc.) and includes a metal core 18. The cap 17 is formed to have a substantially "C"-shaped cross-section. An elastic member 19, of rubber, is bonded via vulcanization, to the outer surface of the metal core 18. The metal core 18 is press-fit into the wheel hub 14 so that the circumferential edge of the cylindrical fitting portion 18a is oriented toward the outboard side. This makes the press-fitting operation of the cap 17 easy. In addition, since the edge portion of the cap 17, having low rigidity, is positioned at the outboard side, the cap 17 does not move toward the outboard side. Thus, it is possible to prevent the cap 17 from slipping off the wheel hub 14 even though the metal core 18 is deformed due to the elastic deformation of the wheel hub 14.

Figure 4:
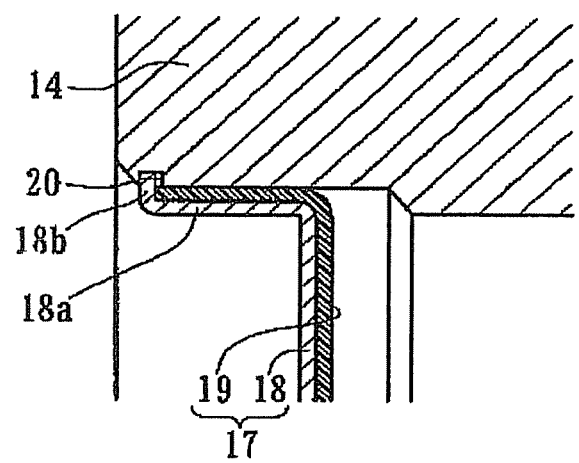
FIG. 4 is a partially enlarged longitudinal-section view of FIG. 3.

As clearly shown in FIG. 4, a bead 18b is formed at the circumferential edge. The bead 18b extends radially outward. It is possible to securely prevent axial movement of the cap 17 by engaging the bead 18b with an annular groove 20 formed on the inner circumferential surface (bore) of the wheel hub 14.

Figure 5:
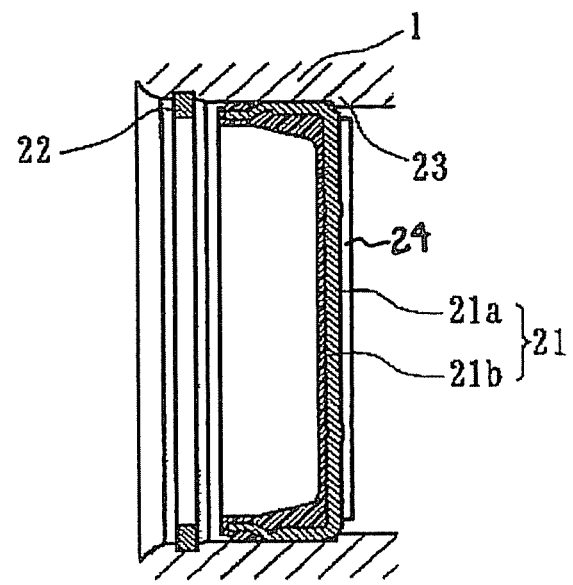
FIG. 5 is a longitudinal-section view of a third embodiment of a vehicle bearing apparatus.

FIG. 5 is an enlarged partial view of a third embodiment of a vehicle wheel bearing apparatus. The same numerals are used as those in the previous embodiments to designate the same structural elements.

In this embodiment, a cap 21 is press-fit into an opening of the wheel hub 1 at its outboard side. The cap 21 is made of austenitic-stainless steel sheet (JIS SUS 304 etc.) or preserved cold rolled steel sheet (JIS SPCC etc.) and includes a metal core 21a formed from steel. The cap 21 has a substantially "C"-shaped cross-section. An elastic member 21b extended from the inner circumferential surface to the cylindrical fitting portion of the metal core 21b. The elastic member 21b is formed from a material such as rubber bonded, via vulcanization, to the surface of the metal core 21a. The elastic member 21b functions to prevent the generation of rust on the metal core 21a and seals the inside of the wheel hub 1 from the outside with intimate contact of the elastic member 21b to the inner circumferential surface (bore) of the wheel hub 1. Accordingly, it is possible to prevent ingress of rain water or dusts from ambient circumstances into the drive shaft and thus into the differential gear oil. Also, it is possible to prevent leakage of the differential gear oil to the outside.

The axial movement of the cap 21 is limited by a stop ring 22 secured on the inner circumferential surface of the wheel hub 1, and a stepped portion 23. Thus, it is possible to prevent the cap 21 from slipping off the wheel hub 1 even though the wheel hub 1 is deformed by the repeated moment load applied during running of the vehicle. Projections 24, co-axially formed on the metal core 21a, increase the rigidity of the metal core 21a and improve the buckling resistance.

Figure 6:
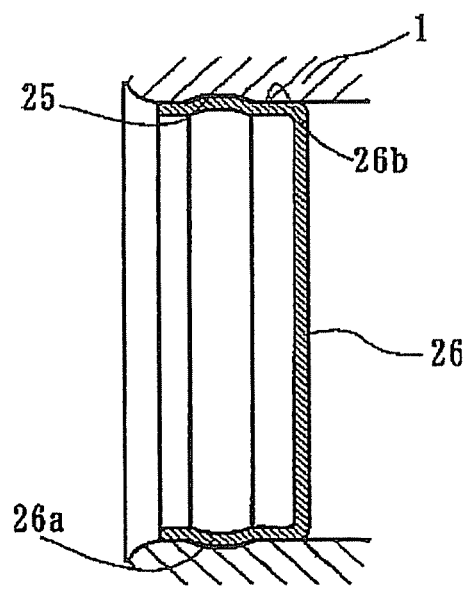
FIG. 6 is a longitudinal-section view of a fourth embodiment of a vehicle wheel bearing apparatus.

FIG. 6 is an enlarged partial view of a fourth embodiment of the vehicle wheel bearing apparatus. The same numerals are used as those used in the previous embodiments to designate the same structural elements.

In this embodiment, an annular recess 25, having a circular arc cross section, is formed on the inner circumferential surface (bore) of the wheel hub 1. A cap 26 is formed with a projection 26a having a cross section corresponding to the annular recess 25. The cap 26 is snapped into the recess 25. This makes the mounting of the cap 26 easy and also prevents axial movement of the cap 26 with a simple structure. In this case, it is unnecessary to form the projection 26a on the whole circumference of the cap 26. Thus, three or more projections will sufficiently perform this function.

Figure 7:
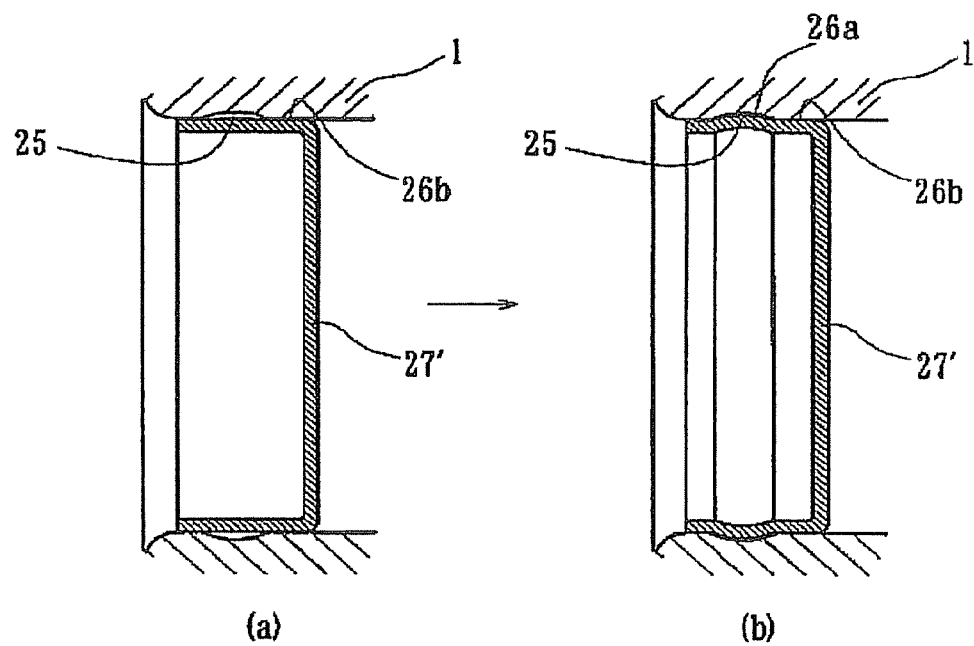
FIGS. 7(a) and 7(b) are a partially enlarged longitudinal-section view of a modification of the fourth embodiment showing, respectively, a condition of a cap before and after caulking.

FIG. 7 is a partially enlarged longitudinal-section view of a modification of the fourth embodiment. The same numerals are used as those used in the previous embodiment (FIG. 6) to designate the same structural elements.

A cap 27' has a substantially "C"-shaped configuration cross section and is press-fit into the inner circumferential surface (bore) of the wheel hub 1 with a predetermined interference. The cap 27' is plastically deformed by a rolling tool and fitted into the annular recess 25. The formed projection 26a can further intimately contact the annular recess 25 of the wheel hub 1 without rattle. Accordingly, it is possible to further effectively prevent axial movement of the cap 27' and to securely prevent leakage of the differential gear oil by this projection 26a in cooperation with the fitting portion 26b.

Figure 8:
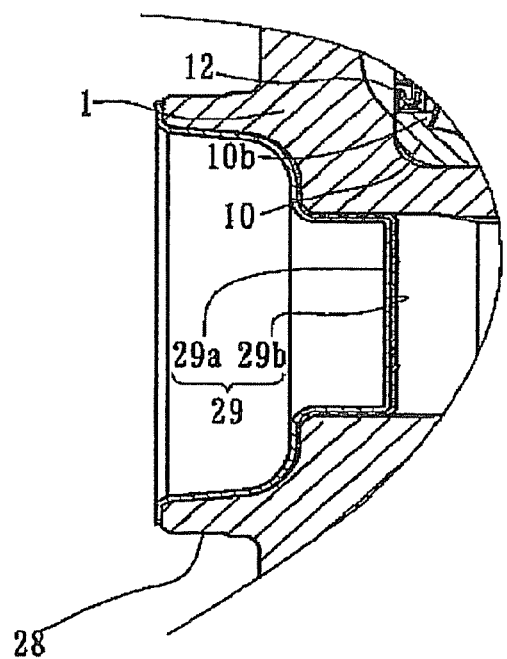
FIG. 8 is a longitudinal-section view of a fifth embodiment of a vehicle wheel bearing apparatus.
Figure 9:
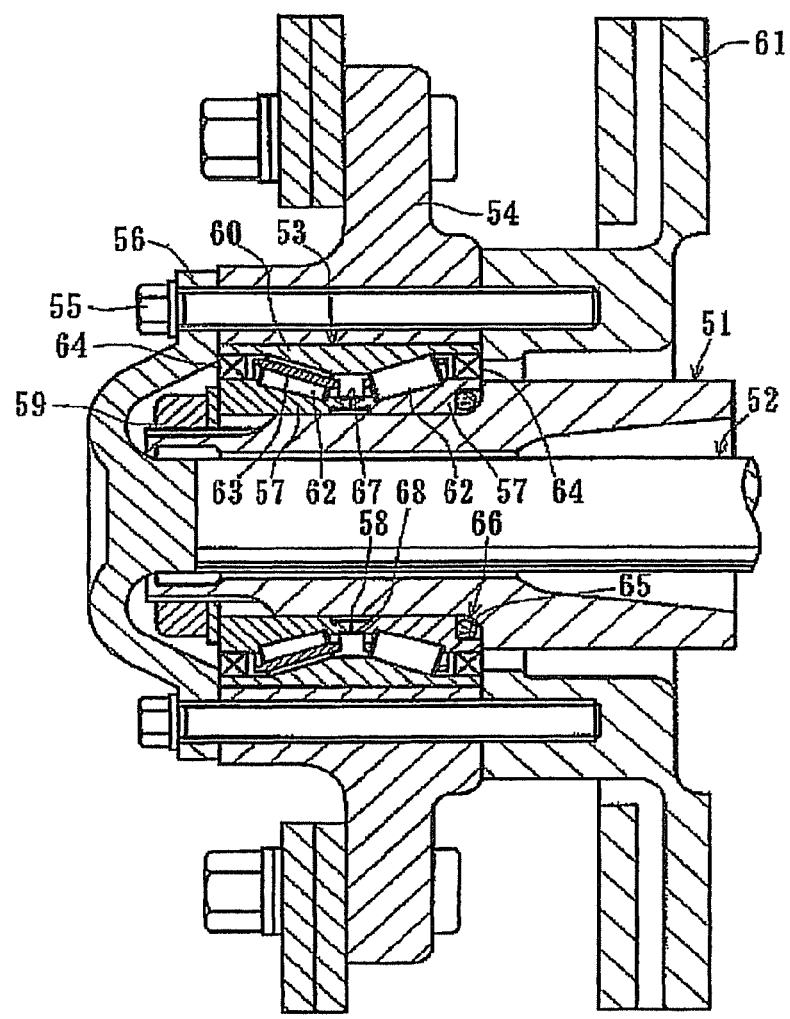
FIG. 9 is a longitudinal-section view of a prior art vehicle wheel bearing apparatus.

FIG. 8 is an enlarged partial view of a fifth embodiment of the vehicle wheel bearing apparatus. The same numerals are used as those in the previous embodiments to designate the same structural elements.

In this embodiment, a cap 29 is press-fit into the wheel hub 1 over a region of the inner circumferential surface (bore) from its opened end at the outboard side to a pilot portion 28. The cap 29 is made of austenitic-stainless steel sheet (JIS SUS 304 etc.) or preserved cold rolled steel sheet (JIS SPCC etc.). The cap 29 includes a metal core 29a press-formed to have a substantially "hat"-shaped cross-section. An elastic member 29b, of rubber, is bonded, via vulcanization, over a region of the metal core 29a from the outer circumferential surface to the fitting portion and the outboard side end of the wheel hub 1.

The elastic member 29b is formed of rubber etc. and is bonded to the metal core 29a, via vulcanization, and can prevent leakage of differential gear oil and ingress of rain water or dusts into the differential gear oil through the drive shaft. In addition, since the cap 29 closes the whole opened portion of the wheel hub 1 and it is press-fit into the portion of the wheel hub 1 which is less deformed even though the repeated moment load is applied to the wheel hub 1, it is possible to further prevent the elastic deformation of the cap 29 and its slipping off from the wheel hub 1.

The vehicle wheel bearing apparatus can be applied to the driving wheel side of the semi-floating type where a wheel bearing is arranged in opened portions between a drive shaft and a axle housing.

The present disclosure has been described with reference to the preferred embodiment. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. A vehicle wheel bearing apparatus for a wheel of vehicle comprising:
   an axle housing supported under a body of a vehicle;
   a hollow drive shaft receiving a differential gear oil and inserted into the axle housing;
   a wheel bearing arranged between the drive shaft and an opening of the axle housing and structured as a unit of a wheel hub and a double row rolling bearing;
   the wheel bearing comprising:
   an inner member including a wheel hub integrally formed with a wheel mounting flange on one end and an axially extending cylindrical portion;
   at least one inner ring press-fit onto the cylindrical portion of the wheel hub and said at least one inner ring with at least one inner raceway surface formed on its outer circumferential surface;
   an outer member arranged around the inner member and formed with double row outer raceway surfaces on its inner circumferential surface opposite to the inner raceway surfaces;
   double row rolling elements arranged between the inner and outer raceway surfaces of the inner member and the outer member;
   a cage for freely rollably holding the rolling elements;
   seals for sealing an annular space between the inner member and the outer member;
   a cap having a metal core is press-fit into an end of a central bore of the wheel hub; and
   the cap having a substantially C-shaped configuration cross-section and an elastic member is bonded to at least part of its fitting portion, the cap prevents leakage of the differential oil in the hollow drive shaft to the outside.

2. The vehicle wheel bearing apparatus of claim 1, wherein said cap is press-fit so that the circumferential edge of its fitting portion is oriented toward the outboard side.

3. The vehicle wheel bearing apparatus of claim 1, wherein said circumferential edge of the fitting portion of the metal core is formed with a radially outwardly extending bead, and an annular groove is formed on the central bore of the wheel hub to engage the bead.

4. The vehicle wheel bearing apparatus of claim 1, wherein said cap is limited against axial movement by steps provided at either sides of the cap.

5. The vehicle wheel bearing apparatus of claim 1, wherein an annular recess is formed on the inner circumferential surface of the wheel hub, and the fitting portion of the cap is formed with a projection adapted to be engaged with the annular recess.

6. The vehicle wheel bearing apparatus of claim 5 wherein said projection is formed by plastic deformation after the cap has been press-fit into the bore of the wheel hub.

7. The vehicle wheel bearing apparatus of claim 1 wherein said at least one of said inner raceway surfaces is formed directly on the outer circumferential surface of the wheel hub.

* * * * *

UNITED STATES PATENT AND TRADEMARK OFFICE
CERTIFICATE OF CORRECTION

PATENT NO. : 8,449,197 B2
APPLICATION NO. : 13/005111
DATED : May 28, 2013
INVENTOR(S) : Hiroshi Kawamura et al.

It is certified that error appears in the above-identified patent and that said Letters Patent is hereby corrected as shown below:

Title Page (75), Inventors, Fifth Inventor
"Hisashi Ohtuski" should be --Hisashi Ohtsuki--

In the Specification
Column 1
Line 12 "2004-0079683" should be --2004-079683--

Column 2
Line 48 "Since," should be --Since--

Column 5
Line 40 "ends," should be --ends--

Signed and Sealed this
First Day of October, 2013

Teresa Stanek Rea
*Deputy Director of the United States Patent and Trademark Office*